US012594523B2

(12) United States Patent      (10) Patent No.:    US 12,594,523 B2

Chinn et al.                  (45) Date of Patent:        Apr. 7, 2026

(54) MEMBRANE CAPTURE OF CO2 FROM REFINERY EMISSIONS

(71) Applicant: CHEVRON U.S.A. INC., San Ramon, CA (US)

(72) Inventors: Daniel Chinn, Danville, CA (US); Nitesh Bhuwania, Richmond, CA (US); Alice Zunqing He, San Rafael, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 116 days.

(21) Appl. No.: 17/493,927

(22) Filed: Oct. 5, 2021

(65) Prior Publication Data

US 2022/0168686 A1     Jun. 2, 2022

Related U.S. Application Data

(60) Provisional application No. 63/087,863, filed on Oct. 5, 2020.

(51) Int. Cl.
| | |
|---|---|
| *B01D 53/22* | (2006.01) |
| *B01D 53/00* | (2006.01) |
| *B01J 20/28* | (2006.01) |
| *F25J 3/06* | (2006.01) |
| *F25J 3/08* | (2006.01) |

(52) U.S. Cl.
CPC ......... *B01D 53/226* (2013.01); *B01D 53/002* (2013.01); *B01D 53/225* (2013.01); *B01D 53/229* (2013.01); *B01J 20/28038* (2013.01);

*F25J 3/062* (2013.01); *F25J 3/067* (2013.01); *B01D 2053/224* (2013.01); *F25J 2205/80* (2013.01)

(58) Field of Classification Search
USPC ........................................ 96/7–10; 95/45, 51
See application file for complete search history.

(56) References Cited

U.S. PATENT DOCUMENTS

| | | | | |
|---|---|---|---|---|
| 2013/0058853 | A1* | 3/2013 | Baker .................... | B01D 53/22 |
| | | | | 423/220 |
| 2013/0137909 | A1* | 5/2013 | Dean ..................... | C10G 35/04 |
| | | | | 585/324 |
| 2022/0331737 | A1* | 10/2022 | DiPietro ................ | B01D 53/22 |

FOREIGN PATENT DOCUMENTS

| | | | |
|---|---|---|---|
| FR | 2990695 | A1 | 11/2013 |

OTHER PUBLICATIONS

PCT International Search Report and Written Opinion mailed on Jan. 3, 2022 issued in Application No. PCT/IB2021/059105, filed on Oct. 5, 2021, 11 pages.

\* cited by examiner

*Primary Examiner* — Frank M Lawrence, Jr.
(74) *Attorney, Agent, or Firm* — HUNTON ANDREWS KURTH LLP

(57) ABSTRACT

The present invention is directed to a method of capturing CO2 from a FCC regenerator using select membranes.

20 Claims, 6 Drawing Sheets

Prior Art

MEMBRANE CAPTURE OF CO2 FROM REFINERY EMISSIONS

FIELD OF THE INVENTION

This invention relates to the reduction of CO2 emissions from a Fluid Catalytic Cracker (FCC) regenerator via membrane capture of CO2.

BACKGROUND OF THE INVENTION

One of the biggest point-sources of CO2 emissions in a refinery is the FCC (Fluid Catalytic Cracker) regenerator offgas. In the FCC regenerator, spent catalyst is regenerated by burning the coke with air at high temperature. An FCC with 390 tonne/day coke will yield emissions of 0.46 million tonnes/year (MMTPA) of CO2 when burned with air based on 20% excess O2. The flue gas from a FCC regenerator is hot, dilute in CO2, and at low-pressure which renders separation and recovery of the CO2 challenging. One known-art process for capturing CO2 is based on amine absorption using solvents such as Fluor Econamine FG, 30 wt. % monoethanolamine (MEA), and Mitsubishisi Heavy Industry's KS-1. The flue gas is first cooled to a suitable temperature such as 50 C, and then compressed in a blower to overcome the pressure drop from the downstream equipment. The gas then goes through an amine plant, which comprises an amine absorber (not shown) for removing the CO2 and an amine regenerator (not shown) for recovering the CO2 from the solvent. The amine plant reduces the direct CO2 emissions from the FCC unit down to 0.08 MMTPA, however, since power and steam are needed to circulate and regenerate the solvent, indirect emissions of 0.10 MMTPA are incurred. The net avoided CO2 emissions are thus 0.26 MMTPA. One of the disadvantages of the amine process is that the process equipment and footprint are significant, which often translate to high capital costs. High steam consumption leads to high operating costs and high indirect CO2 emissions from the steam boilers.

A method for capturing CO2 without high steam consumption and lower indirect CO2 emissions is therefore desired.

SUMMARY OF THE INVENTION

Herein is disclosed a method for CO2 capture from refinery exhaust emissions or flue gas using crossflow and sweep-based membranes in series.

A further embodiment is a method of lowering the input of energy required to capture CO2 from an FCC regenerator using select membranes.

DETAILED DESCRIPTION OF THE INVENTION

Figure 1:
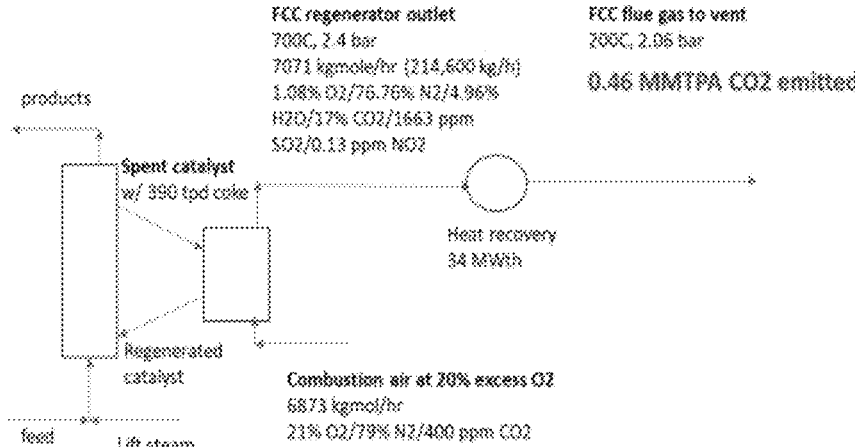
FIG. 1 is a diagram of FCC emissions.
Figure 2:
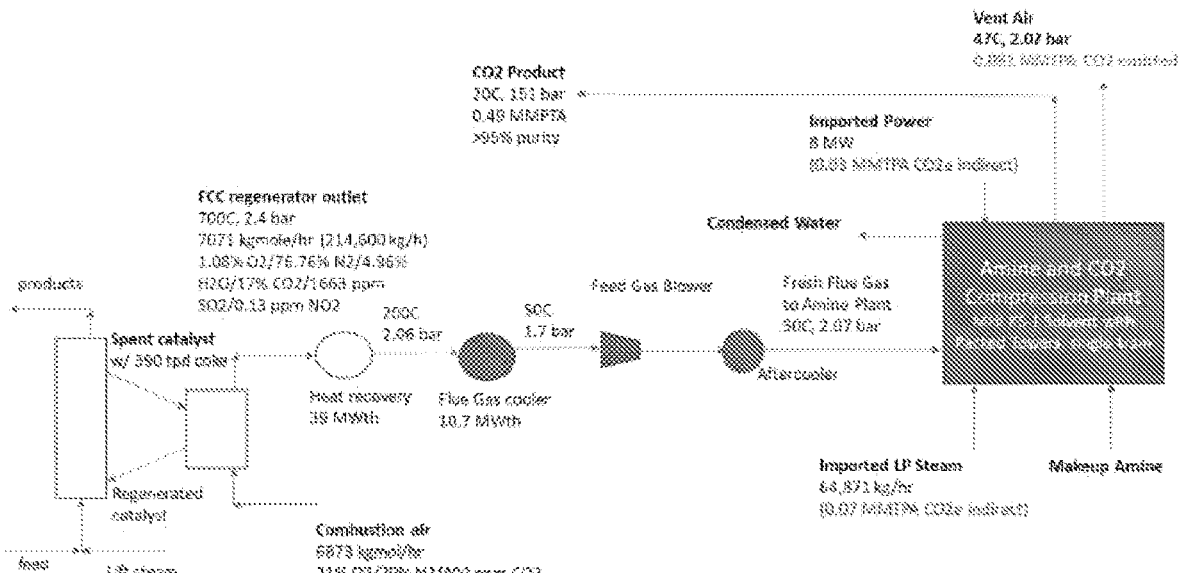
FIG. 2 is a diagram of a process for capturing CO2 known in the art based on amine absorption.
Figure 3:
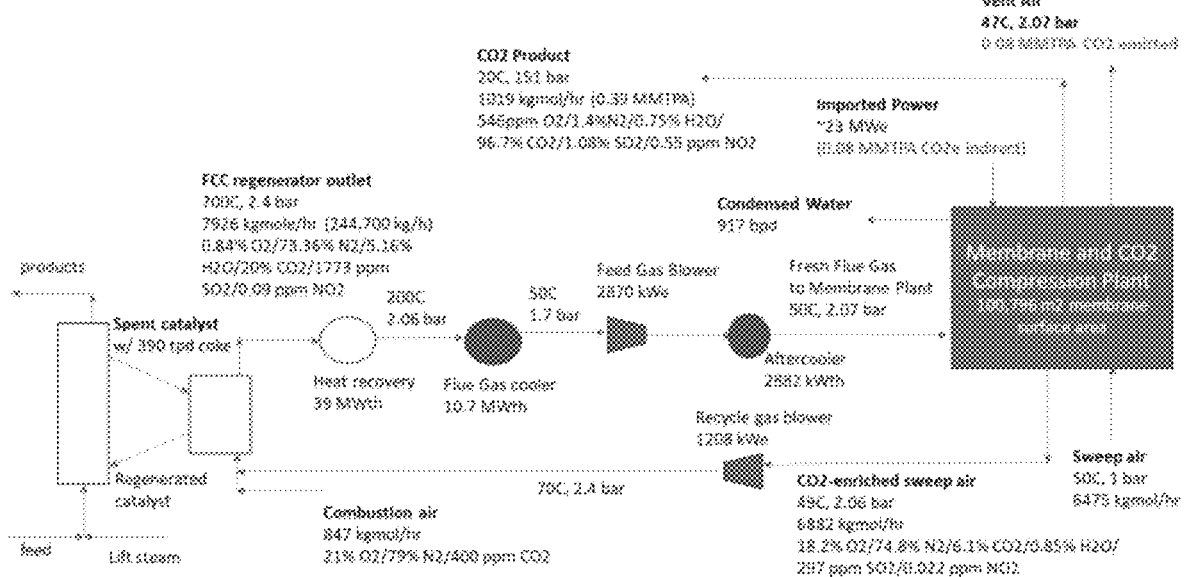
FIG. 3 and FIG. 4 show how a membrane process may be integrated with a FCC regenerator.
Figure 4:
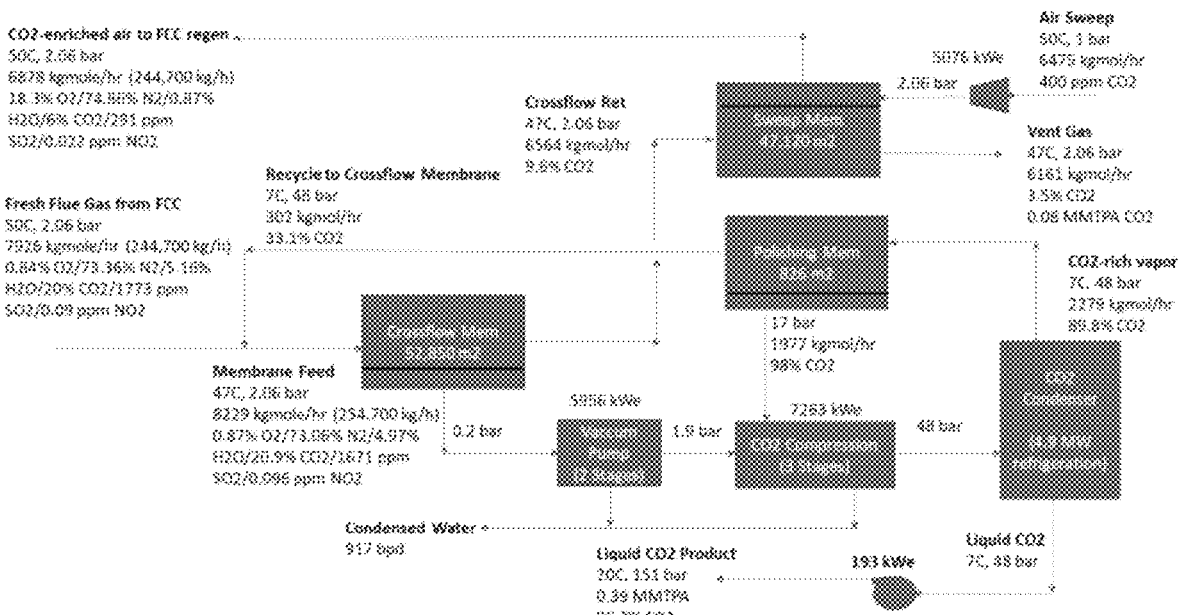

Herein is a further embodiment for CO2 capture from a FCC wherein a membrane process may be integrated with a FCC regenerator (FIG. 3 & FIG. 4).

Embodiments of the invention as described herein pertain to refinery-based combustion systems and flue gas treatment systems which incorporate sweep-based membrane separation units to control carbon dioxide emissions from combustion processes and streams.

An embodiment of the invention is a method for capturing CO2 produced from a FCC regenerator flue gas comprising, (1) cooling and compression of the flue gas to overcome the pressure drop in equipment downstream of the FCC regenerator; (2) operating a crossflow membrane at vacuum permeate pressure to remove the bulk of the CO2, followed by a membrane which operates with a counter-current air sweep on the permeate side to further reduce the CO2 amount; (3) two stage compression of permeate from the crossflow membrane using vacuum pumps and then in 3 stages of compression to 48 bar; (4) liquefying the CO2 using a CO2 liquefaction unit that liquefies CO2 out the bottom and produces a CO2-rich vapor which is sent to a high-pressure polishing membrane; (5) recycling the permeate of the polishing membrane to the liquefaction unit feed while the retentate is recycled to the crossflow membrane feed.

Another embodiment of the invention (as seen in FIG. 3) is cooling and compression of the flue gas to overcome the pressure drop in equipment downstream of the FCC regenerator. The difference with the amine process is twofold: (1) there is no steam import required, and (2) a portion of the combustion air for the FCC is replaced by a CO2-enriched, oxygen-depleted air sweep. The air sweep flowrate is adjusted to ensure the same % excess oxygen as the uncontrolled FCC. The direct emissions of the membrane process is 0.08 MMTPA. Indirect emissions from 23 MW of power import is 0.08 MMTPA, which results in an avoidance of 0.46−0.08−0.08=0.30 MMTPA, which is 15% better than the amine case. FIG. 4 shows more detail of how to arrange the membrane flowsheet.

Previous efforts to remove CO2 from a flue gas comprise removal in two stages in series and may be based exclusively on spiral-wound membranes which have inherently less packing efficiency and thus will necessarily take up more space in a refinery operation compared to using hollow-fiber membranes. Therefore, an embodiment of the invention is the use of a crossflow membrane which operates at vacuum permeate pressure, 0.1 to 0.2 bar, to remove the bulk of the CO2, followed by a hollow-fiber module which operates with a counter-current air sweep on the permeate side to further reduce the CO2 amount. The permeate from the crossflow membrane is compressed in 2 stages using vacuum pumps and then in 3 stages of compression to 48 bar. A CO2 liquefaction unit operating at 7 C liquefies CO2 out the bottoms and produces a CO2-rich vapor which is sent to a high-pressure polishing membrane. The permeate of the polishing membrane is recycled to the liquefaction unit feed while the retentate is recycled to the crossflow membrane feed. The sweep stream has enriched CO2 but slightly depleted O2 is combined with combustion air in the FCC regenerator.

Figure 6:
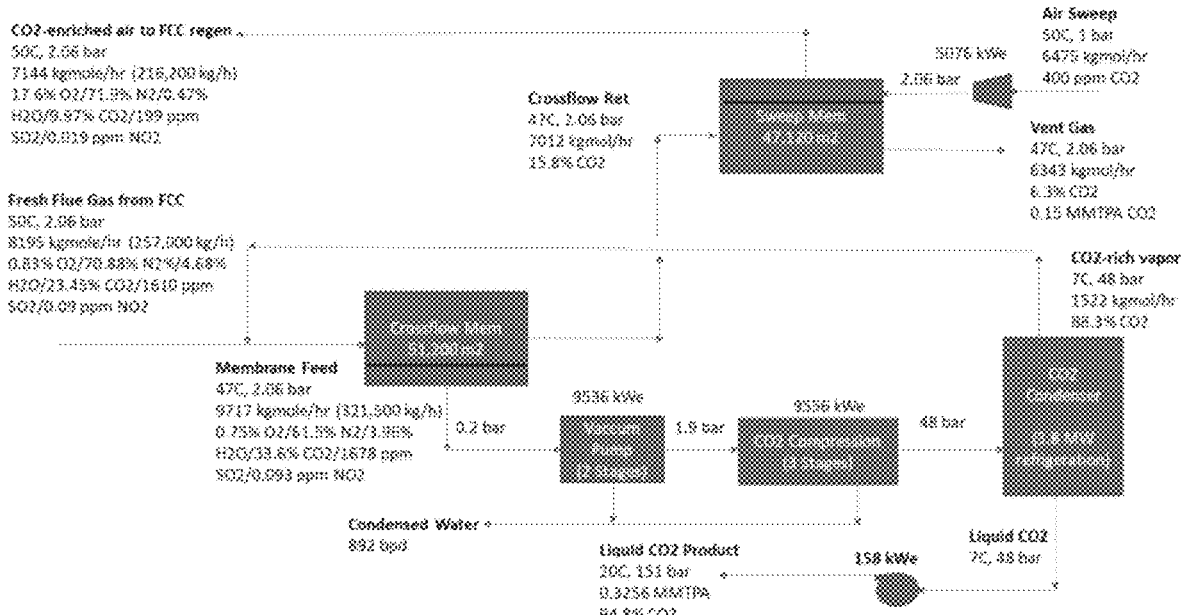
FIG. 6 is a diagram of an alternative embodiment of the membrane configuration wherein the polishing membrane is eliminated.

An embodiment of the membrane configuration is elimination of the polishing membrane (FIG. 6). The overhead of the CO2 condenser is recycled back to the feed of the crossflow membrane. Because the crossflow membrane is processing a much higher % CO2 compared to the process in FIG. 4, the overall CO2 recovery is worse and permeate compression requirements are higher.

Permeance is directly related to the thickness of the membrane and will characterize the gas transport through the membrane. Permeance is an important parameter when comparing the separation suitability of membranes for mixed gases. A practical unit often used is gas permeation unit (GPU). The membranes for the crossflow, air sweep, and polishing steps are all preferably polymeric, hollow-fiber membranes with CO2 permeance of >1000 GPU and CO2/N2 selectivity of 25 to 50 and O2/N2 selectivity of 5 to 10. The polymeric materials may be any known in the art provided they can achieve this separation performance under both wet flue gas conditions and in the high-pressure polishing conditions. For example, the crossflow membrane may have high GPU and selectivity for CO2, while the sweep membrane has high GPU and selectivity for CO2, and low O2/N2 selectivity and the polishing membrane operates at 45 bar and 7 C—low to modest CO2/N2 selectivity but high CO2 permeance and high durability.

The hollow fiber membranes may be selected from those known to one of skill in the art selected from the consisting of polypropylene, polyethylene, polytetrafluoroethylene, polyvinylidene difluoride, polysulfone, PEBAX, PDMS, polyimide, carbon molecular sieve, graphene oxide, mixed matrix—comprising zeolites and or metal organic frameworks and polyetherimide based membranes.

An FCC combustor will have different operating parameters with regard to temperature, pressure and excess O2 when compared to other combustion sources. As such, a preferred embodiment of the invention, seen in FIG. 4, wherein the flue gas from FCC containing CO2 is fed to a crossflow membrane for feed into a sweep membrane or to a vacuum pump with CO2 compression, condensation and feed to a polishing membrane, results in the largest amount of avoided CO2 emissions.

Figure 5:
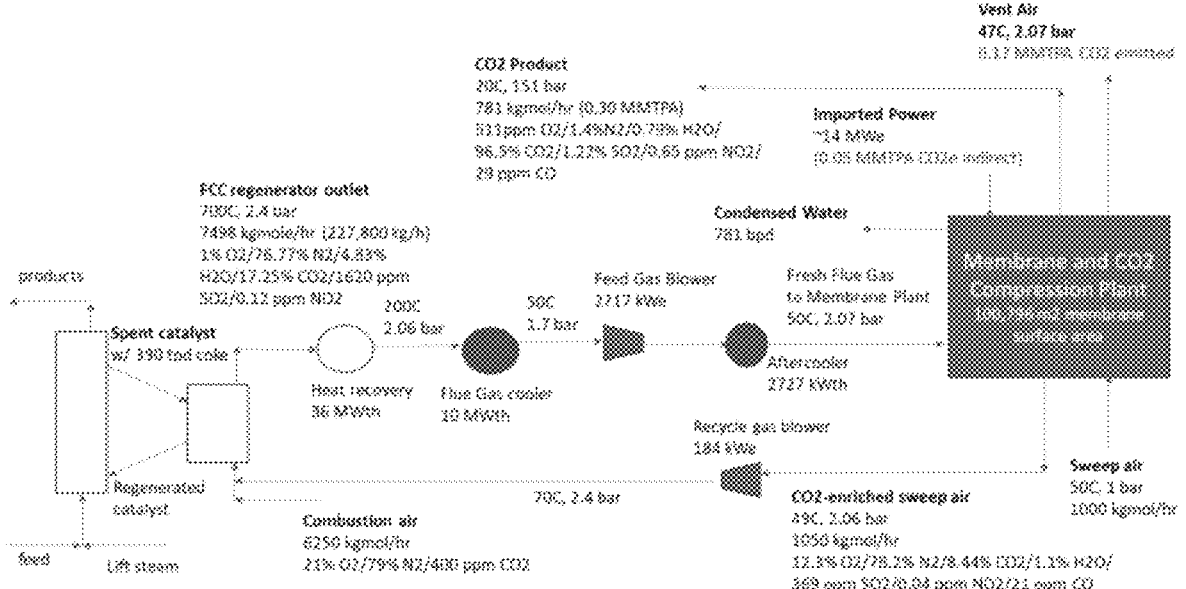
FIG. 5 is another embodiment in the process where a lower sweep gas flowrate is used while a higher amount of fresh air is used for the FCC regenerator to achieve 20% excess O2.

Table 1 summarizes a comparison of the various embodiments. The process with the highest avoided CO2 emissions is FIG. 4, utilizing a high air sweep and polishing membrane. The process with the lowest power requirement is FIG. 5, utilizing a low air sweep and polishing membrane.

TABLE 1

| | Controlled FCC | Membrane Case 1-high sweep | Membrane Case 2-low sweep | Membrane Case 3-no polishing |
|---|---|---|---|---|
| Combustion Air (kgmol/hr) | 6873 | 847 | 6250 | 847 |
| Sweep Air (kgmol/hr) | 0 | 6475 | 1000 | 6475 |
| Total Air (kgmol/hr) to FCC | 6873 | 7322 | 7250 | 7322 |
| CO2 direct emissions (MMTPA) | 0.46 | 0.08 | 0.17 | 0.15 |
| CO2 indirect emissions (MMTPA) | 0 | 0.08 | 0.05 | 0.11 |
| Total CO2 emissions (MMTPA) | 0.46 | 0.16 | 0.22 | 0.26 |
| Power import (MW) | 0 | 23 | 14 | 28.5 |
| Total membrane surface area (m2) | 0 | 100,796 | 100,796 | 98,320 |

4

TABLE 1-continued

| | Controlled FCC | Membrane Case 1-high sweep | Membrane Case 2-low sweep | Membrane Case 3-no polishing |
|---|---|---|---|---|
| CO2 liquid product (>95 mol % purity, 151 bar) | 0 | 0.39 | 0.30 | 0.33 |

What is claimed is:

1. A method for capturing CO2 produced from a FCC regenerator flue gas comprising,
   (1) cooling and compression of the flue gas to overcome a pressure drop in equipment downstream of the FCC regenerator;
   (2) operating a crossflow membrane at vacuum permeate pressure to remove the bulk of the CO2, followed by a membrane which operates with a counter-current air sweep on the permeate side to further reduce the CO2 amount;
   (3) two stage compression of permeate from the crossflow membrane using vacuum pumps and then in 3 stages of compression to 48 bar;
   (4) liquefying the CO2 from the 3 stages of compression using a CO2 liquefaction unit that liquefies CO2 out the bottom and produces a CO2-rich vapor which is sent to a high-pressure polishing membrane;
   (5) recycling the permeate of the polishing membrane to the liquefaction unit feed while the retentate is recycled directly to the crossflow membrane feed;
   wherein the counter-current air sweep flowrate is adjusted to maintain about the same percentage of excess oxygen as an uncontrolled FCC regenerator.

2. The method of claim 1 wherein the crossflow membrane and polishing membrane are hollow fiber membranes selected from the group consisting of polypropylene, polyethylene, polytetrafluoroethylene, polyvinylidene difluoride, polysulfone, polyamide-polyether block copolymer, PDMS, polyimide, carbon molecular sieve, graphene oxide, mixed matrix, zeolites, metal organic frameworks and polyetherimide.

3. The method of claim 2 wherein the vacuum permeate pressure is 0.1 to 0.2 bar.

4. The method of claim 3 wherein the liquefaction unit is operating at 7° C. to liquefy the CO2.

5. The method of claim 1, wherein the cooling of the flue gas comprises reducing the temperature from about 700° C. to about 50° C. through a plurality of stages.

6. The method of claim 1, wherein the crossflow membrane operates at a feed pressure of about 2.06 bar.

7. The method of claim 1, wherein the FCC regenerator flue gas contains about 17.25-20% CO2 by volume.

8. The method of claim 1, wherein the liquefaction unit operates at a temperature of 7° C. and a pressure of 48 bar to produce liquid CO2 with a purity greater than 95 mol %.

9. The method of claim 1, wherein the high-pressure polishing membrane operates at a feed pressure of 48 bar and achieves a CO2 purity in the permeate of 98%.

10. The method of claim 2, wherein the hollow fiber membranes have a CO2/N2 selectivity of 25-50 and a CO2 permeance greater than 1000 GPU.

11. A method for capturing CO2 produced from a FCC regenerator flue gas comprising,
   (1) cooling and compression of the flue gas to overcome a pressure drop in equipment downstream of the FCC regenerator;

(2) operating a crossflow membrane at vacuum permeate pressure to remove the bulk of the $CO_2$, followed by a membrane which operates with a counter-current air sweep on the permeate side to further reduce the $CO_2$ amount;

(3) two stage compression of permeate from the crossflow membrane using vacuum pumps and then in 3 stages of compression to 48 bar;

(4) liquefying the $CO_2$ from the 3 stages of compression using a $CO_2$ liquefaction unit that liquefies $CO_2$ out the bottom and produces a $CO_2$-rich vapor which is sent to a high-pressure polishing membrane;

(5) recycling the permeate of the polishing membrane to the liquefaction unit feed while the retentate is recycled directly to the crossflow membrane feed;

wherein a portion of the combustion air for the FCC regenerator is replaced by the $CO_2$-enriched, oxygen-depleted air sweep from the membrane operating with counter-current air sweep.

12. The method of claim 11 wherein the crossflow membrane and polishing membrane are hollow fiber membranes selected from the group consisting of polypropylene, polyethylene, polytetrafluoroethylene, polyvinylidene difluoride, polysulfone, polyamide-polyether block copolymer, PDMS, polyimide, carbon molecular sieve, graphene oxide, mixed matrix, zeolites, metal organic frameworks and polyetherimide.

13. The method of claim 12 wherein the vacuum permeate pressure is 0.1 to 0.2 bar.

14. The method of claim 13 wherein the liquefaction unit is operating at 7° C. to liquefy the $CO_2$.

15. The method of claim 11, wherein the cooling of the flue gas comprises reducing the temperature from about 700° C. to about 50° C. through a plurality of stages.

16. The method of claim 11, wherein the crossflow membrane operates at a feed pressure of about 2.06.

17. The method of claim 11, wherein the FCC regenerator flue gas contains about 17.25-20% $CO_2$ by volume.

18. The method of claim 11, wherein the liquefaction unit operates at a temperature of 7° C. and a pressure of 48 bar to produce liquid $CO_2$ with a purity greater than 95 mol %.

19. The method of claim 11, wherein the high-pressure polishing membrane operates at a feed pressure of 48 bar and achieves a $CO_2$ purity in the permeate of 98%.

20. The method of claim 7, wherein the hollow fiber membranes have a $CO_2/N_2$ selectivity of 25-50 and a $CO_2$ permeance greater than 1000 GPU.

* * * * *